(12) United States Patent
Singh et al.

(10) Patent No.: US 12,220,946 B2
(45) Date of Patent: Feb. 11, 2025

(54) TIRE REPLACEMENT FORECASTING SYSTEM AND METHOD

(71) Applicant: The Goodyear Tire & Rubber Company, Akron, OH (US)

(72) Inventors: Kanwar Bharat Singh, Lorenztweiler (LU); Mustafa Ali Arat, Ettelbruck (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 358 days.

(21) Appl. No.: 17/719,410

(22) Filed: Apr. 13, 2022

(65) Prior Publication Data

US 2022/0388348 A1    Dec. 8, 2022

Related U.S. Application Data (60) Provisional application No. 63/208,025, filed on Jun. 8, 2021.

(51) Int. Cl.
  *B60C 11/24*    (2006.01)
  *B60C 23/04*    (2006.01)
  (Continued)

(52) U.S. Cl.
  CPC ........ *B60C 11/246* (2013.01); *B60C 23/0486* (2013.01); *B60W 40/105* (2013.01);
  (Continued)

(58) Field of Classification Search
  CPC ..... B60C 11/246; B60C 23/001; B60C 23/04; B60C 23/0408; B60C 23/0486;
  (Continued)

(56) References Cited

U.S. PATENT DOCUMENTS

| | | |
|---|---|---|
| 5,749,984 A | 5/1998 | Frey et al. |
| 5,864,056 A | 1/1999 | Bell et al. |

(Continued)

FOREIGN PATENT DOCUMENTS

| | | |
|---|---|---|
| CN | 101183402 A | 5/2008 |
| CN | 106248401 A | 12/2016 |

(Continued)

OTHER PUBLICATIONS

Zhou Haibin, Prediction of wear life of engineering tires, Prediction of wear life of engineering tires, Jun. 30, 2004, 36-40, 46, 6, World Rubber Industry.

(Continued)

*Primary Examiner* — Yoshihisa Ishizuka
(74) *Attorney, Agent, or Firm* — Edward T. Kennedy (57) ABSTRACT

A tire replacement forecasting system includes a tire supporting a vehicle. A sensor unit is mounted on the tire and includes a footprint centerline length measurement sensor and a pressure sensor. A processor is in electronic communication with the sensor unit and receives the measured centerline length and the measured pressure. An electronic vehicle network transmits selected vehicle parameters to the processor. A wear state predictor is stored on the processor and receives the measured centerline length, the measured pressure, and the selected vehicle parameters to generate an estimated wear state of the tire. A forecasting model is stored on the processor and receives multiple estimated wear states of the tire, and predicts future wear states of the tire. A forecast tire replacement date is generated by the forecasting model when the predicted future wear states of the tire are estimated to pass a predetermined wear threshold.

15 Claims, 8 Drawing Sheets

(51) Int. Cl.
*B60W 40/105* (2012.01)
*G07C 5/08* (2006.01)

(52) U.S. Cl.
CPC ..... *G07C 5/0816* (2013.01); *B60W 2520/105* (2013.01); *B60W 2520/125* (2013.01)

(58) Field of Classification Search
CPC .......... B60C 23/064; B60W 2520/105; B60W 2520/125; B60W 40/105; G07C 5/0816
See application file for complete search history.

(56) References Cited

U.S. PATENT DOCUMENTS

| | | |
|---|---|---|
| 6,083,268 A | 7/2000 | Kelsey et al. |
| 6,430,993 B1 | 8/2002 | Seta |
| 6,532,812 B2 | 3/2003 | King |
| 6,591,668 B1 | 7/2003 | Becherer et al. |
| 6,883,962 B2 | 4/2005 | Kurata |
| 7,158,018 B2 | 1/2007 | Schick |
| 7,299,694 B2 | 11/2007 | Byrne |
| 7,404,318 B2 | 7/2008 | Merino-Lopez et al. |
| 7,523,656 B1 | 4/2009 | Blixhavn et al. |
| 7,543,491 B2 | 6/2009 | Hammerschmidt et al. |
| 7,568,384 B2 | 8/2009 | Morinaga |
| 7,577,532 B2 | 8/2009 | Ichikawa et al. |
| 7,673,505 B2 | 3/2010 | Hammerschmidt |
| 7,680,610 B2 | 3/2010 | Miyashita et al. |
| 7,755,367 B2 | 7/2010 | Schoen et al. |
| 8,049,515 B2 | 11/2011 | Schoen et al. |
| 8,065,911 B2 | 11/2011 | Taylor et al. |
| 8,096,172 B2 | 1/2012 | Gotschlich |
| 8,371,159 B2 | 2/2013 | Morinaga |
| 8,402,821 B2 | 3/2013 | Fink et al. |
| 8,443,660 B2 | 5/2013 | Grande et al. |
| 8,483,976 B2 | 7/2013 | Morinaga |
| 8,555,698 B2 | 10/2013 | Neugebauer et al. |
| 8,558,680 B2 | 10/2013 | Pannek |
| 8,775,017 B2 | 7/2014 | Brusarosco et al. |
| 8,794,058 B2 | 8/2014 | Bigot et al. |
| 8,833,410 B2 | 9/2014 | Paturle |
| 8,849,500 B2 | 9/2014 | Gokyu et al. |
| 8,881,573 B2 | 11/2014 | Paturle et al. |
| 8,892,298 B2 | 11/2014 | Paturle et al. |
| 8,904,869 B2 | 12/2014 | Paturle |
| 9,052,257 B2 | 6/2015 | Shibata |
| 9,423,320 B2 | 8/2016 | Kuramoto et al. |
| 9,513,192 B2 | 12/2016 | Kretschmann et al. |
| 9,669,664 B2 | 6/2017 | Kretschmann |
| 9,873,293 B2 | 1/2018 | Singh et al. |
| 9,908,374 B2 | 3/2018 | Dussinger et al. |
| 9,921,134 B2 | 3/2018 | Unterreiner et al. |
| 9,962,999 B2 | 5/2018 | Roty |
| 9,963,146 B2 | 5/2018 | Singh et al. |
| 9,994,082 B2 | 6/2018 | Seboe et al. |
| 10,000,100 B2 | 6/2018 | Weston |
| 10,005,328 B2 | 6/2018 | Makino et al. |
| 10,024,765 B2 | 7/2018 | Neau |
| 10,082,381 B2 | 9/2018 | McMillen |
| 10,112,444 B2 | 10/2018 | Takahashi et al. |
| 10,132,719 B2 | 11/2018 | Fudulea |
| 10,207,551 B2 | 2/2019 | Benbouhout et al. |
| 10,222,299 B2 | 3/2019 | Ledoux |
| 10,245,906 B2 | 4/2019 | Singh et al. |
| 10,252,583 B2 | 4/2019 | Kandler et al. |
| 10,259,274 B2 | 4/2019 | Lange et al. |
| 10,286,734 B2 | 5/2019 | Masago |
| 10,286,735 B2 | 5/2019 | Guinart et al. |
| 10,328,755 B2 | 6/2019 | Tebano et al. |
| 10,350,949 B2 | 7/2019 | Surendra |
| 10,399,396 B2 | 9/2019 | Limbrunner et al. |
| 10,471,779 B2 | 11/2019 | Masago |
| 10,495,457 B2 | 12/2019 | Cyllik et al. |
| 10,513,156 B2 | 12/2019 | Hrabal |
| 10,603,962 B2 | 3/2020 | Singh |
| 11,548,324 B2 | 1/2023 | Singh et al. |
| 2004/0049303 A1 | 3/2004 | Levy et al. |
| 2005/0229691 A1* | 10/2005 | Shaw ................. B60C 23/0408 73/146 |
| 2006/0114107 A1 | 6/2006 | Kim et al. |
| 2008/0228411 A1* | 9/2008 | Miyashita ............... B60C 19/00 703/2 |
| 2012/0273102 A1 | 11/2012 | Paturle |
| 2015/0040656 A1 | 2/2015 | Singh et al. |
| 2015/0247780 A1 | 9/2015 | Kretschmann et al. |
| 2016/0129737 A1* | 5/2016 | Singh .................... B60W 40/13 73/146.3 |
| 2016/0381068 A1* | 12/2016 | Galula ................. G07C 5/0816 726/23 |
| 2017/0043776 A1* | 2/2017 | Sujan .................... F02D 41/021 |
| 2017/0124784 A1 | 5/2017 | Wittman et al. |
| 2018/0066929 A1 | 3/2018 | Kandler et al. |
| 2018/0154707 A1 | 6/2018 | Singh |
| 2018/0180463 A1 | 6/2018 | Cyllik et al. |
| 2018/0253109 A1 | 9/2018 | Fontaine et al. |
| 2019/0001757 A1* | 1/2019 | Singh ................. B60C 23/0415 |
| 2019/0009618 A1 | 1/2019 | Mcpillan et al. |
| 2019/0025113 A1 | 1/2019 | Masago |
| 2019/0184763 A1 | 6/2019 | Pulford et al. |
| 2019/0193479 A1 | 6/2019 | Pulford et al. |
| 2019/0270347 A1 | 9/2019 | Stewart et al. |
| 2019/0304084 A1 | 10/2019 | Oblizajek |
| 2019/0382034 A1 | 12/2019 | Miller et al. |
| 2020/0001662 A1 | 1/2020 | Storti et al. |
| 2020/0023693 A1 | 1/2020 | Ochi et al. |
| 2020/0031183 A1 | 1/2020 | Kim |
| 2020/0047571 A1 | 2/2020 | Oblizajek |
| 2020/0062268 A1 | 2/2020 | Steiner |
| 2020/0070589 A1 | 3/2020 | Kuerzl et al. |
| 2020/0094634 A1 | 3/2020 | Decoster et al. |
| 2020/0126323 A1 | 4/2020 | Ledoux et al. |
| 2020/0182746 A1 | 6/2020 | Singh |
| 2020/0369270 A1* | 11/2020 | Antonsson ........... G08G 1/0129 |
| 2021/0008933 A1 | 1/2021 | Kretschmann et al. |
| 2021/0061022 A1 | 3/2021 | Singh et al. |
| 2021/0101416 A1 | 4/2021 | Kim et al. |

FOREIGN PATENT DOCUMENTS

| | | | |
|---|---|---|---|
| CN | 109472885 A | 3/2019 | |
| DE | 102013208553 A1 | 11/2014 | |
| DE | 102013220882 A1 | 4/2015 | |
| DE | 102014214626 A1 | 1/2016 | |
| DE | 102017221142 A1 | 5/2019 | |
| EP | 2778631 A2 * | 9/2014 | .......... B60T 8/17551 |
| EP | 3318422 A1 | 5/2018 | |
| JP | 2013169816 A | 9/2013 | |
| JP | 2016137847 A | 8/2016 | |
| KR | 101741730 B1 | 6/2017 | |
| WO | 2015055429 A1 | 4/2015 | |
| WO | 2019186353 A1 | 10/2019 | |
| WO | 2019239305 A3 | 2/2020 | |
| WO | 2020070051 A1 | 4/2020 | |

OTHER PUBLICATIONS

Zhu Chunxia, et al., Computer simulation of radial tire wear, Computer simulation of radial tire wear, Feb. 1, 2008, 57-58, 2, Research on Agricultural Mechanization.

Search report issued in corresponding European application received by applicant on Oct. 7, 2022.

* cited by examiner

TIRE REPLACEMENT FORECASTING SYSTEM AND METHOD

FIELD OF THE INVENTION

The invention relates generally to tire monitoring systems. More particularly, the invention relates to systems that predict tire wear. Specifically, the invention is directed to a system and method for forecasting optimum tire replacement based on predicted wear states of the tire.

BACKGROUND OF THE INVENTION

Tire wear plays an important role in vehicle factors such as safety, reliability, and performance. Tread wear, which refers to the loss of material from the tread of the tire, directly affects such vehicle factors. As a result, it is desirable to monitor and/or measure the amount of tread wear experienced by a tire, which is indicated as the tire wear state. It is to be understood that for the purpose of convenience, the terms "tread wear" and "tire wear" may be used interchangeably.

One approach to the monitoring and/or measurement of tread wear has been through the use of wear sensors disposed in the tire tread, which has been referred to as a direct method or approach. The direct approach to measuring tire wear from tire-mounted sensors has multiple challenges. Placing the sensors in an uncured or "green" tire to then be cured at high temperatures may cause damage to the wear sensors. In addition, sensor durability can prove to be an issue in meeting the millions of cycles requirement for tires. Moreover, wear sensors in a direct measurement approach must be small enough not to cause any uniformity problems as the tire rotates at high speeds. Finally, wear sensors can be expensive and add significantly to the cost of the tire.

Due to such challenges, alternative approaches have been developed, which involve prediction of tread wear over the life of the tire, including indirect estimations of the tire wear state. These alternative approaches have experienced some disadvantages in the prior art due to a lack of optimum prediction techniques, which reduces the accuracy and/or reliability of the tread wear predictions. For example, many such techniques involve data or information that is not easily obtained, such as non-standard vehicle system signals, or data that is not accurate under all driving conditions.

In addition, while some indirect estimation techniques have been developed that show improved accuracy and/or reliability, such techniques tend to indicate only the wear state of the tire. While such information is helpful, it may be of limited value for certain users. For example, some users may not fully understand an indication of tire wear state. In addition, many systems compare an estimated tire wear state to a threshold to inform the user that the tire should be replaced after the tire has reached a minimum wear state or threshold. However, it is often desirable to advise or notify a user well in advance of a wear threshold that a tire may need to be replaced. Such advance notice enables the user to proactively schedule tire replacement as desired, and before a minimum wear state or threshold is reached.

As a result, there is a need in the art for a system and method that accurately and reliably estimates a tire wear state, predicts future wear states of the tire, and forecasts optimum tire replacement based on the wear states.

SUMMARY OF THE INVENTION

According to an aspect of an exemplary embodiment of the invention, a tire replacement forecasting system is provided. The system includes a vehicle and a tire supporting the vehicle. A sensor unit is mounted on the tire and includes a footprint centerline length measurement sensor to measure a centerline length of a footprint of the tire, and a pressure sensor to measure a pressure of the tire. A processor is in electronic communication with the sensor unit and receives the measured centerline length and the measured pressure. An electronic vehicle network transmits selected vehicle parameters to the processor. A wear state predictor is stored on the processor and receives the measured centerline length, the measured pressure, and the selected vehicle parameters as inputs, and generates an estimated wear state of the tire from the inputs. A forecasting model is stored on the processor and receives as inputs multiple estimated wear states of the tire as generated from the state predictor, and the forecasting model predicts future wear states of the tire. A forecast tire replacement date is generated by the forecasting model when the predicted future wear states of the tire are estimated to pass a predetermined wear threshold.

According to another aspect of an exemplary embodiment of the invention, a method of forecasting replacement of a tire supporting a vehicle is provided. The method includes the steps of mounting a sensor unit on the tire, measuring a footprint centerline length of the tire with the sensor unit, and measuring a pressure of the tire with the sensor unit. The measured centerline length and the measured pressure are received in a processor. Selected vehicle parameters are transmitted from an electronic vehicle network to the processor. A wear state predictor is stored on the processor and receives the measured centerline length, the measured pressure, and the selected vehicle parameters as inputs. The wear state predictor generates an estimated wear state of the tire. A forecasting model is stored on the processor and receives as inputs multiple estimated wear states of the tire from the wear state predictor. Future wear states of the tire are predicted with the forecasting model. A forecast tire replacement date is generated with the forecasting model when the predicted future wear states of the tire are estimated to pass a predetermined wear threshold.

BRIEF DESCRIPTION OF THE DRAWINGS

The invention will be described by way of example and with reference to the accompanying drawings, in which.

Similar numerals refer to similar parts throughout the drawings.

Definitions

"ANN" or "artificial neural network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Axial" and "axially" means lines or directions that are parallel to the axis of rotation of the tire.

"CAN bus" is an abbreviation for controller area network.

"Circumferential" means lines or directions extending along the perimeter of the surface of the annular tread perpendicular to the axial direction.

"Equatorial centerplane (CP)" means the plane perpendicular to the axis of rotation of the tire and passing through the center of the tread.

"Footprint" means the contact patch or area of contact created by the tire tread with a flat surface as the tire rotates or rolls.

"Inboard side" means the side of the tire nearest the vehicle when the tire is mounted on a wheel and the wheel is mounted on the vehicle.

"Lateral" means an axial direction.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Tread element" or "traction element" means a rib or a block element defined by a shape having adjacent grooves.

DETAILED DESCRIPTION OF THE INVENTION

Figure 1:
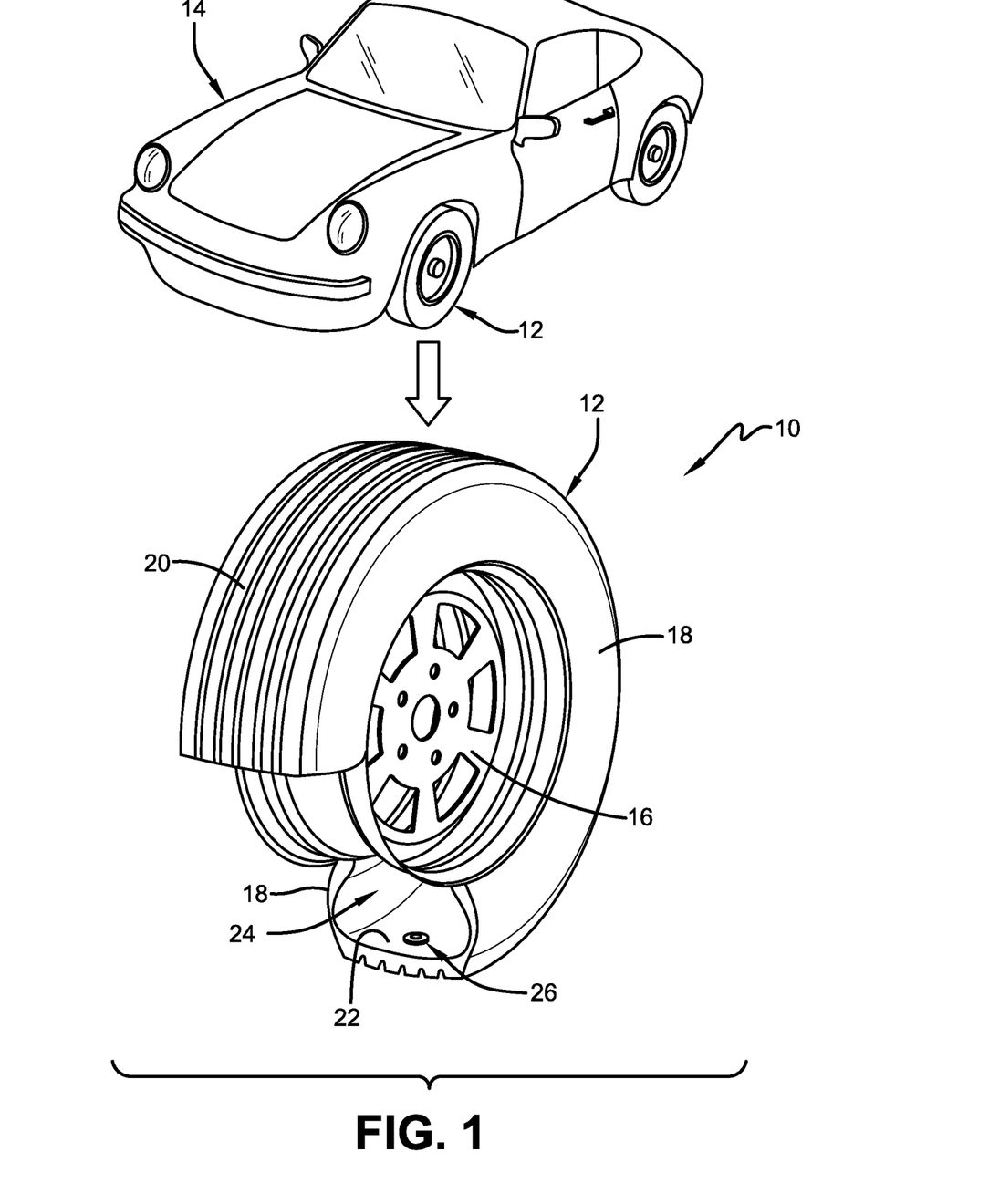
FIG. 1 is a schematic perspective view of a vehicle that includes a tire employing an exemplary embodiment of the tire replacement forecasting system of the present invention.

With reference to FIGS. 1 through 10, an exemplary embodiment of the tire replacement forecasting system of the present invention is indicated at 10. With particular reference to FIG. 1, the system 10 forecasts replacement of each tire 12 supporting a vehicle 14. While the vehicle 14 is depicted as a passenger car, the invention is not to be so restricted. The principles of the invention find application in other vehicle categories, such as commercial trucks, in which vehicles may be supported by more or fewer tires than those shown in FIG. 1.

The tires 12 are of conventional construction, and each tire is mounted on a respective wheel 16 as known to those skilled in the art. Each tire 12 includes a pair of sidewalls 18 that extend to a circumferential tread 20, which wears with age from road abrasion. An innerliner 22 is disposed on the inner surface of the tire 12, and when the tire is mounted on the wheel 16, an internal cavity 24 is formed, which is filled with a pressurized fluid, such as air.

A sensor unit 26 is attached to the innerliner 22 of each tire 12 by means such as an adhesive, and measures certain parameters or conditions of the tire as will be described in greater detail below. It is to be understood that the sensor unit 26 may be attached in such a manner, or to other components of the tire 12, such as on or in one of the sidewalls 18, on or in the tread 20, on the wheel 16, and/or a combination thereof. For the purpose of convenience, reference herein shall be made to mounting of the sensor unit 26 on the tire 12, with the understanding that such mounting includes all such attachment.

The sensor unit 26 is mounted on each tire 12 for the purpose of detecting certain real-time tire parameters, such as tire pressure 38 (FIG. 4) and/or tire temperature. For this reason, the sensor unit 26 preferably includes a pressure sensor and/or a temperature sensor, and may be of any known configuration.

The sensor unit 26 preferably also includes electronic memory capacity for storing identification (ID) information for each tire 12, known as tire ID information. Alternatively, tire ID information may be included in another sensor unit, or in a separate tire ID storage medium, such as a tire ID tag, which preferably is in electronic communication with the sensor unit 26. The tire ID information may include tire parameter and/or manufacturing information for each tire 12, such as: the tire type; tire model; size information, such as rim size, width, and outer diameter; manufacturing location; manufacturing date; a treadcap code that includes or correlates to a compound identification; a mold code that includes or correlates to a tread structure identification; a tire footprint shape factor (FSF), a mold design drop; a tire belt/breaker angle; and an overlay material.

Figure 2:
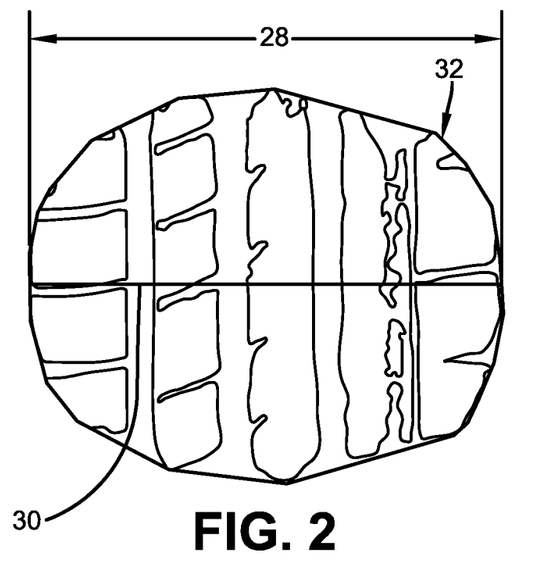
FIG. 2 is a plan view of a footprint of the tire shown in FIG. 1 in a new condition.

Turning to FIG. 2, the sensor unit 26 (FIG. 1) preferably also measures a length 28 of a centerline 30 of a footprint 32 of the tire 12. More particularly, as the tire 12 contacts the ground, the area of contact created by the tread 20 with the ground is known as the footprint 32. The centerline 30 of the footprint 32 corresponds to the equatorial centerplane of the tire 12, which is the plane that is perpendicular to the axis of rotation of the tire and which passes through the center of the tread 20. The sensor unit 26 thus measures the length 28 of the centerline 30 of the tire footprint 32, which is referred to herein as the footprint centerline length 28. Any suitable technique for measuring the footprint centerline length 28 may be employed by the sensor unit 26. For example, the sensor unit 26 may include a strain sensor or piezoelectric sensor that measures deformation of the tread 20 and thus indicates the centerline length 28.

Figure 3:
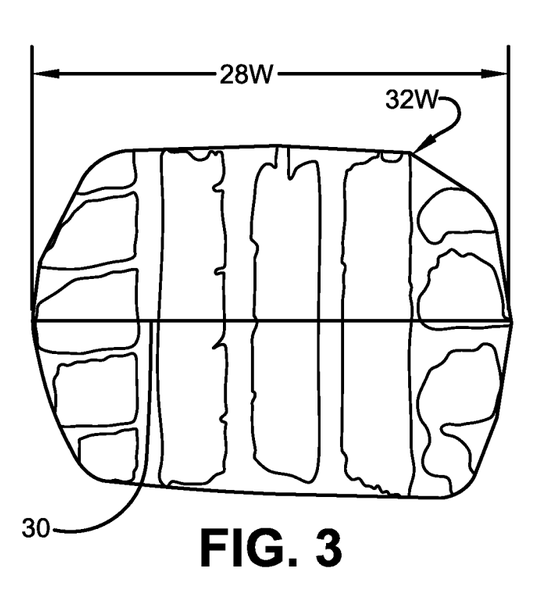
FIG. 3 is a plan view of a footprint of the tire shown in FIG. 1 in a worn condition.

It has been observed that, as the tire 12 wears, the centerline length 28 decreases. For example, the footprint 32 shown in FIG. 2 corresponds to a tire 12 in a new condition without tire wear. FIG. 3 shows the footprint of the same tire 12 in a worn state or condition after traveling about 21,000 kilometers (km). After such travel, the tire 12 experienced about a 30 percent (%) reduction of tread depth, as shown by the footprint after wear, indicated at 32W, and a decrease of about 6% in the centerline length, indicated by 28W, when compared to the new condition shown in FIG. 2. This observation shows that the centerline length 28, 28W may be an indicator of the wear state of the tire 12.

Further testing confirmed this observation, showing a reduction of centerline length 28 corresponding to wear of the tire 12, including up to a 20% decrease in the centerline length when the tread depth was reduced by 100%, or completely reduced to a legal limit. It is to be understood that the sensor unit 26 measures the centerline length 28, 28W of the tire 12 at a certain point in time, and for the purpose of convenience, any such measurement shall be referred to as the centerline length 28.

It is to be understood that the pressure sensor, the temperature sensor, the tire ID capacity and/or the centerline length sensor may be incorporated into the single sensor unit 26, or may be incorporated into multiple units. For the purpose of convenience, reference herein shall be made to a single sensor unit 26.

Figure 4:
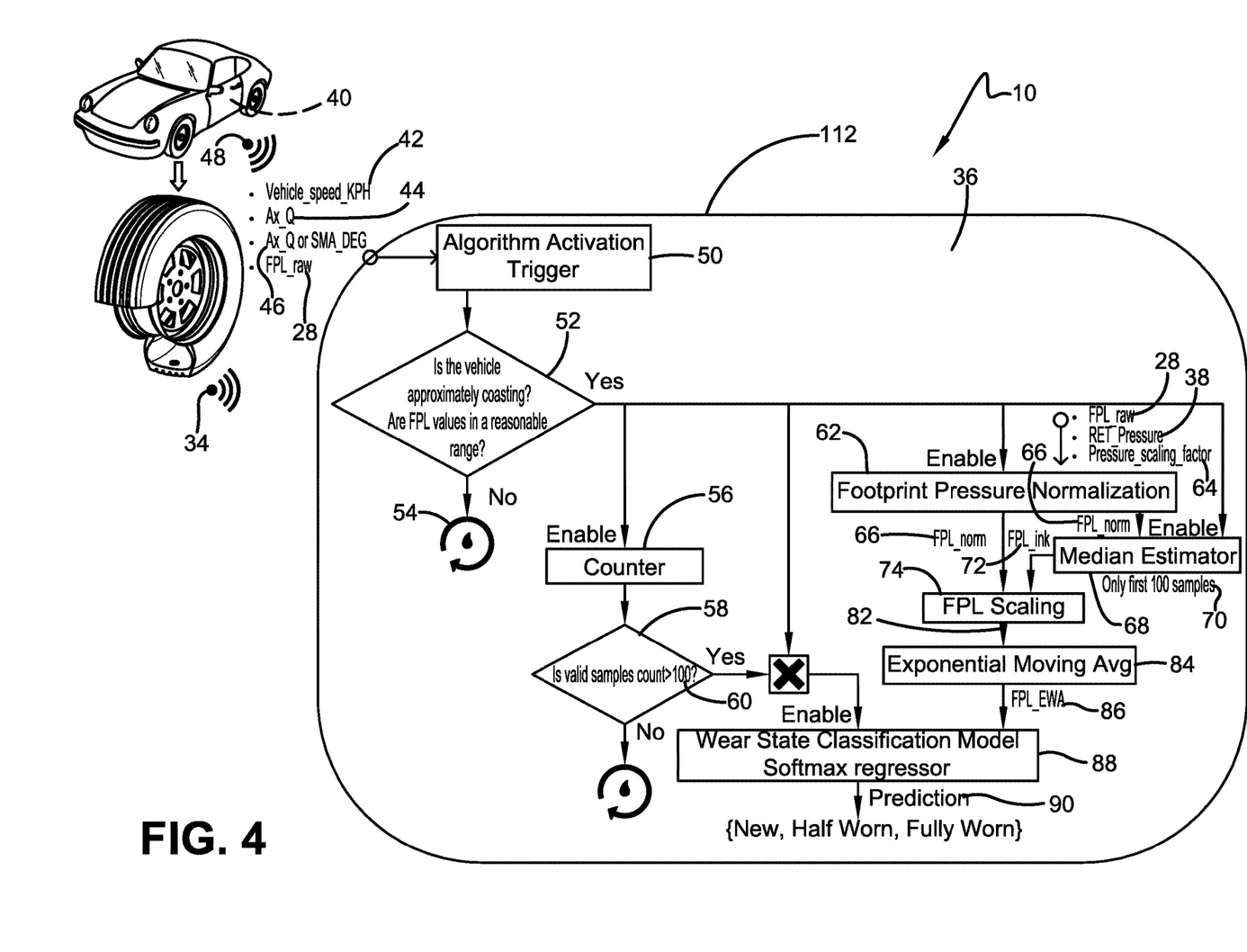
FIG. 4 is a first schematic diagram of aspects of an exemplary embodiment of the tire replacement forecasting system of the present invention.
Figure 5:
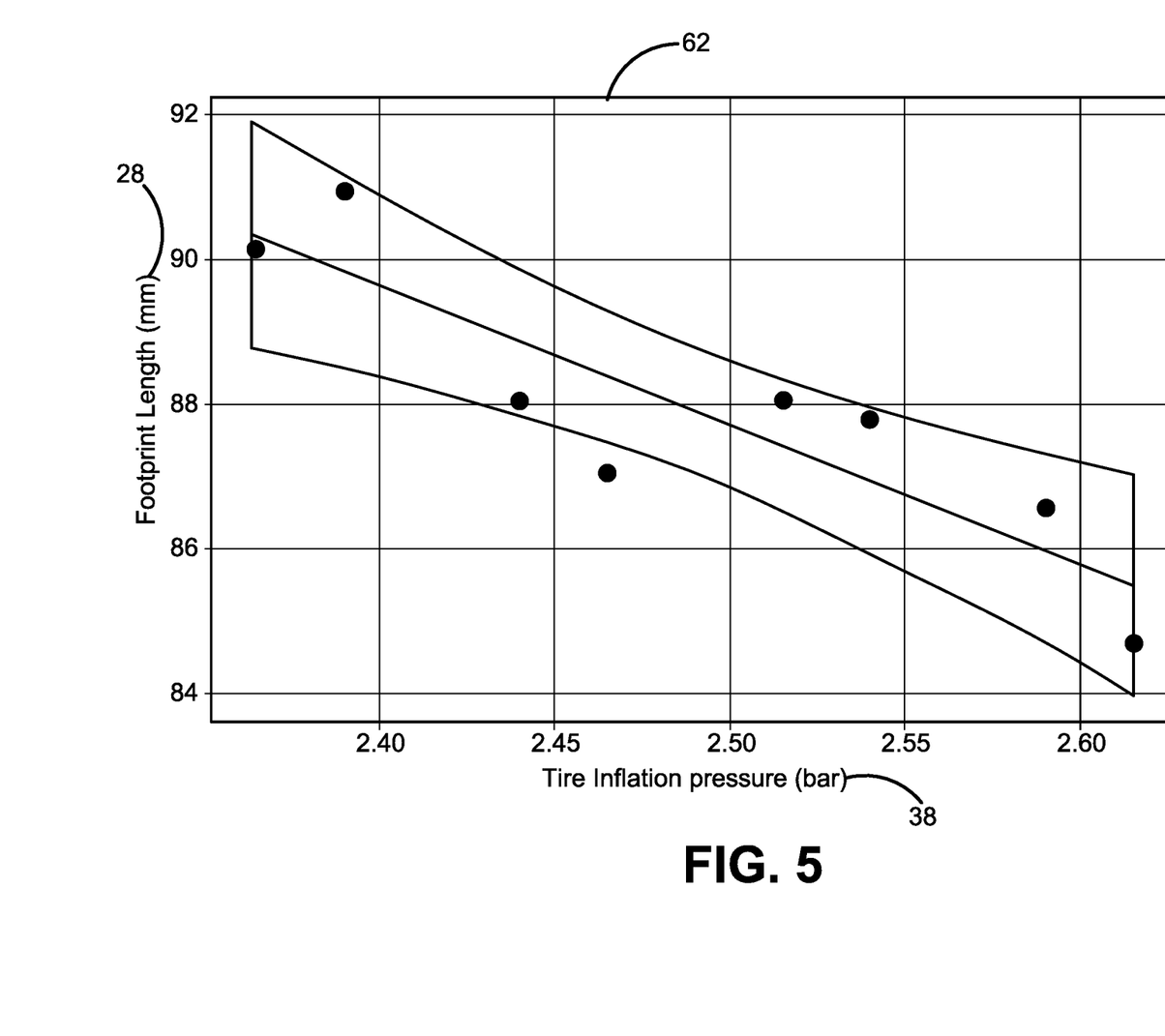
FIG. 5 is a first graphical representation of aspects of the tire replacement forecasting system of the present invention.

With reference to FIG. 4, the sensor unit 26 includes transmission means 34 for sending the measured parameters of tire pressure 38 and centerline length 28, as well as tire ID information, to a processor 36. The sensor unit transmission means 34 preferably includes an antenna for wireless radio frequency transmission. The processor 36 may be integrated into the sensor unit 26, or may be a remote processor, which may be mounted on the vehicle 14 or may be cloud-based. For the purpose of convenience, the processor 36 will be described as a remote processor mounted on the vehicle 14, with the understanding that the processor may alternatively be cloud-based or integrated into the sensor unit 26.

The vehicle 14 includes an electronic network, which is known in the art as a CAN bus 40. The CAN bus 40 transmits selected vehicle parameters, including vehicle speed 42, lateral acceleration 44, and longitudinal acceleration 46 to the processor 36 through vehicle transmission means 48. The vehicle transmission means 48 preferably includes an antenna for wireless radio frequency transmission. Alternatively, one or more of the vehicle speed 42, lateral acceleration 44, and longitudinal acceleration 46 may be measured by the sensor unit 26 and transmitted to the processor 36 by the sensor unit transmission means 34.

Aspects of the tire replacement forecasting system 10 preferably are executed on the processor 36, which enables input of data from the sensor unit 26 and/or the CAN bus 40 for execution of specific analysis techniques and algorithms, to be described below, which are stored in a suitable storage medium that are also in electronic communication with the processor.

In this manner, the sensor unit 26 measures the tire pressure 38 and centerline length 28, and transmits these measured tire parameters to the processor 36 with the tire ID information. The vehicle parameters of vehicle speed 42, lateral acceleration 44, and longitudinal acceleration 46 are also transmitted to the processor 36. A wear state predictor 112 is stored on or is in electronic communication with the processor 36. Upon receipt by the processor 36, an activation trigger 50 of the wear state predictor 112 initiates the analysis technique of the tire replacement forecasting system 10.

The activation trigger 50 actuates a screening module 52, which reviews the vehicle speed 42, lateral acceleration 44, and longitudinal acceleration 46 to determine if the vehicle 14 is traveling along a generally straight path at a constant speed, referred to as coasting. More particularly, the optimum measured centerline length 28 for the tire replacement forecasting system 10 preferably is obtained when the vehicle 14 is coasting. If the vehicle speed 42 varies beyond a predetermined minimum and maximum, if the lateral acceleration 44 exceeds a predetermined threshold, and/or the longitudinal acceleration 46 exceeds a predetermined threshold, the vehicle 14 is not coasting, and the screening module 52 halts execution of tire replacement forecasting 54.

If the vehicle speed 42 is within the predetermined minimum and maximum, if the lateral acceleration 44 is below the predetermined threshold, and/or the longitudinal acceleration 46 is below the predetermined threshold, the screening module 52 determines that the vehicle 14 is coasting, and a counter module 56 commences. The counter module 56 ensures that a sufficient sample size of centerline length measurements 28 is gathered for analysis by the system 10. A counter 58 counts the centerline length measurements 28 until a predetermined sample size 60 is obtained, such as at least one hundred (100) measurements. When the predetermined sample size 60 is reached, the counter 58 allows a wear state estimate, which will be described in detail below, to be generated.

If the screening module 52 determines that the vehicle 14 is coasting, a normalization module 62 also commences. With additional reference to FIG. 5, each measured footprint centerline length 28 is impacted by changes in the inflation pressure 38 of the tire 12. The normalization module 62 reduces or removes the impact of inflation changes on the measured footprint centerline lengths 28. Preferably, the measured footprint centerline lengths 28 and corresponding measured tire pressures 38 are input into the normalization module 62 and a pressure scaling factor 64 is applied. For example, the pressure scaling factor 64 may be the change in the measured footprint centerline lengths 28 divided by the change in the measured tire pressures 38. When the pressure scaling factor 64 is applied, the measured footprint centerline lengths 28 are centered about the same mean value for the entire pressure range, enabling normalized footprint centerline lengths 66 to be generated and output from the normalization module 62.

Returning to FIG. 4, a median estimator 68 receives the normalized footprint centerline lengths 66 and holds them until a predetermined number or sample size 70 of normalized footprint centerline lengths is received. For example, the sample size 70 may be one hundred (100) normalized footprint centerline lengths 66. Once the predetermined sample size 70 is reached, the median estimator calculates a median 72 of the sample of the footprint centerline lengths 66. In this manner, the median estimator 68 scales the normalized footprint centerline lengths 66 so that the system 10 employs a relative change in footprint length, rather than an absolute change in footprint length. The median normalized footprint centerline lengths 72 are output from the median estimator 68.

Figure 6:
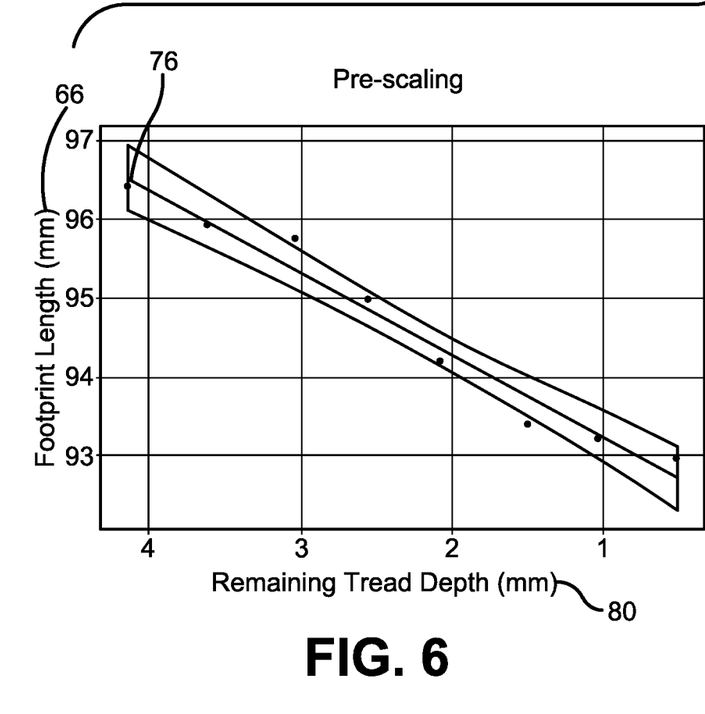
FIG. 6 is a second graphical representation of aspects of the tire replacement forecasting system of the present invention.
Figure 7:
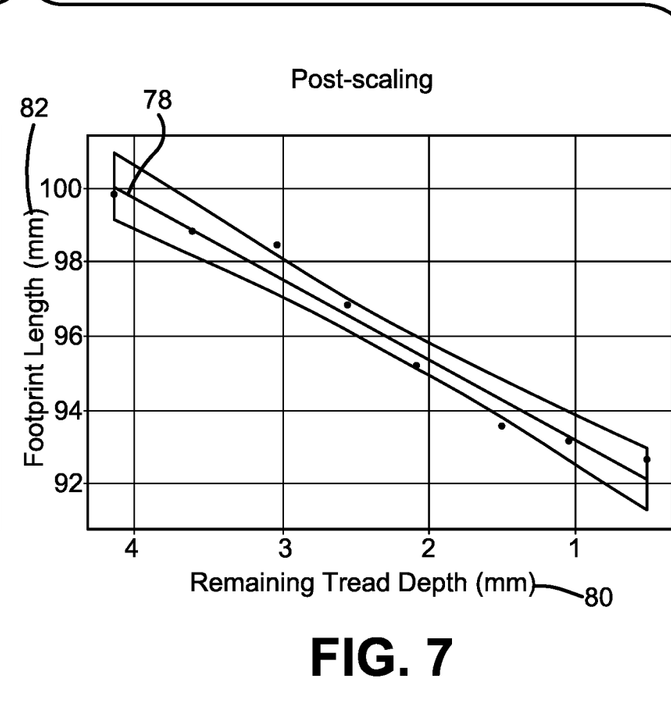
FIG. 7 is a third graphical representation of aspects of the tire replacement forecasting system of the present invention.

With additional reference to FIGS. 6 and 7, the normalized footprint centerline lengths 66 and the median normalized footprint centerline lengths 72 are input into a scaling module 74. As shown in FIG. 6, variation in the construction of each respective tire 12 (FIG. 1) impacts each normalized footprint centerline length 66 and the remaining depth 80 of the tread 20. The scaling module 74 rescales an initial value 76 of the normalized footprint centerline lengths 66 to a standard value 78, such as 100, as shown in FIG. 7. The rescaling performed by the scaling module 74 thus generates scaled footprint centerline lengths 82, which reduces or removes the impact of variation in the construction of each respective tire 12.

Returning to FIG. 4, the scaled footprint centerline lengths 82 are input into an exponential moving average calculator 84. The exponential moving average calculator 84 enables the wear state predictor 112 to place greater emphasis on the most recently measured footprint centerline lengths 28 and thus the most recent scaled footprint centerline lengths 82, thereby focusing on the most recent and most relevant data points. The exponential moving average calculator 84 generates exponentially weighted footprint centerline lengths 86.

The exponentially weighted footprint centerline lengths 86 are input into a wear state model 88, which generates an estimated wear state prediction 90 for each tire 12. The wear state model 88 may be a classification model, which expresses the estimated wear state 90 as a specific state or class of the tire 12, such as new, half worn or fully worn. Alternatively, the wear state model 88 may be a regression model, which expresses the estimated wear state 90 as a remaining tread depth of the tire 12 in millimeters or inches.

Figure 8:
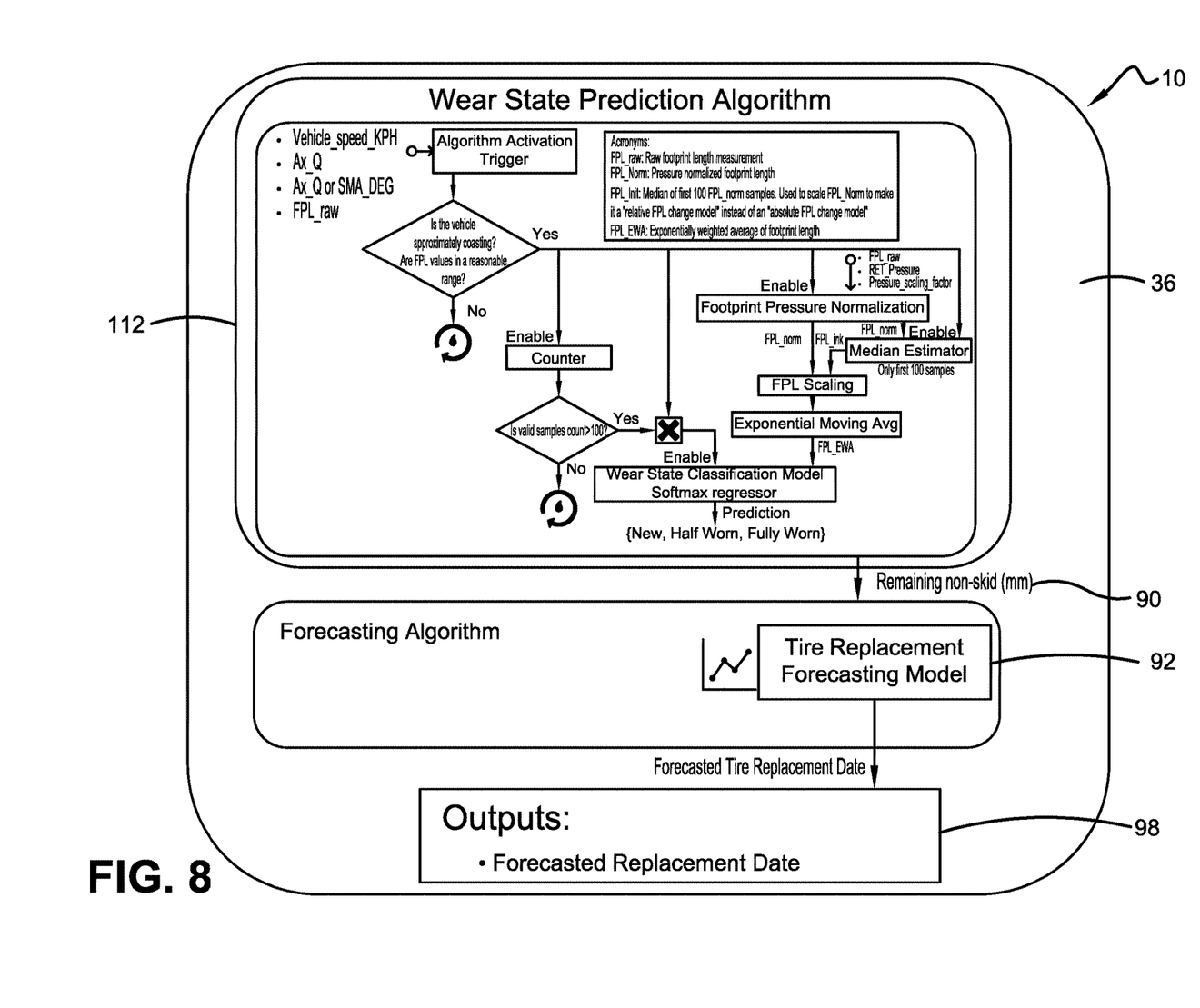
FIG. 8 is a second schematic diagram of aspects of the tire replacement forecasting system of the present invention.

Turning to FIG. 8, the estimated wear state 90 from the wear state predictor 112 is input into a forecasting model 92. The forecasting model 92 preferably is a time series forecasting model, such as an exponential smoothing model. In addition, the estimated wear state 90 may be expressed as an amount of non-skid tread 20 remaining on each tire 12 in millimeters (mm). Non-skid tread 20 is known in the art as the depth of the tread 20 extending from a radially outer surface of the tread radially inwardly to the base of the deepest groove formed in the tread.

Figure 9:
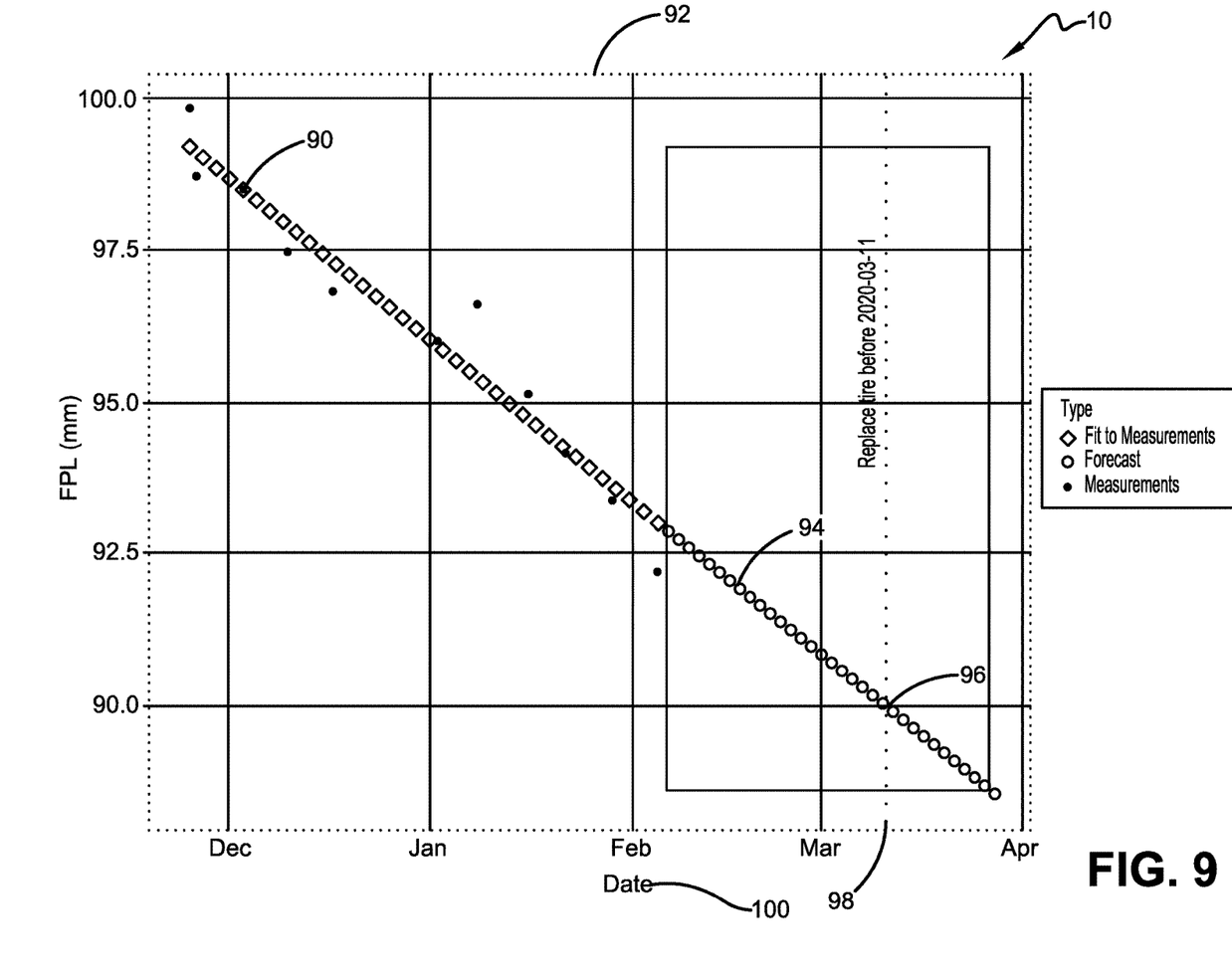
FIG. 9 is a fourth graphical representation of aspects of the tire replacement forecasting system of the present invention.

With additional reference to FIG. 9, the forecasting model 92 analyzes multiple estimated wear states 90 with respect to time 100 and forecasts or predicts future wear states 94 of the tire 12. When the predicted future wear states 94 are estimated to pass a predetermined wear threshold 96, a forecast tire replacement date 98 is generated.

Figure 10:
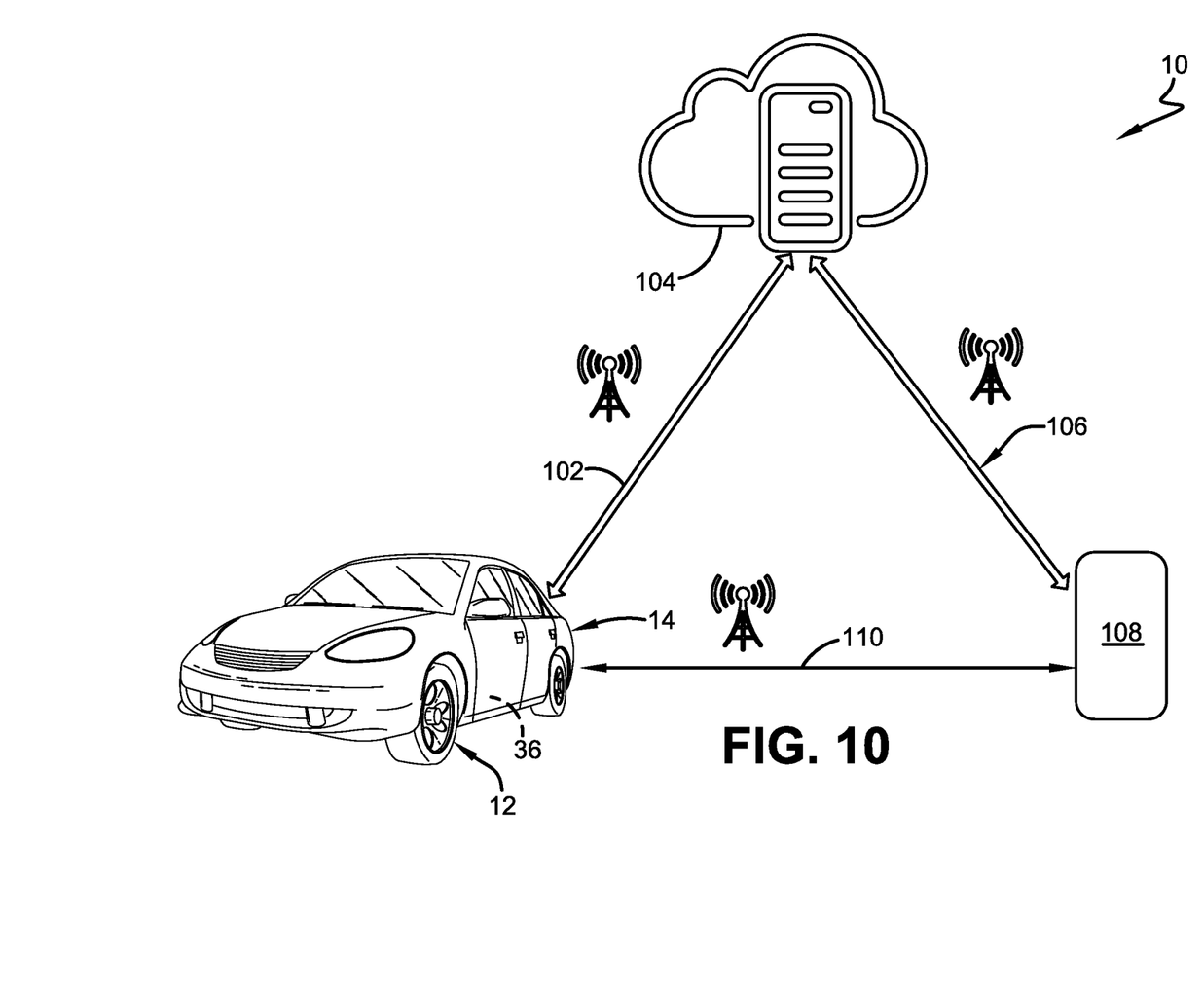
FIG. 10 is a schematic diagram of the vehicle shown in FIG. 1 with a representation of data transmission to a cloud-based server and to a user device.

Referring to FIG. 10, when the forecast tire replacement date 98 (FIG. 9) is generated for each tire 12, the data may be wirelessly transmitted 102 from the processor 36 on the vehicle 14 to a remote processor, such as a processor in a cloud-based server 104. The forecast tire replacement date 98 may also be wirelessly transmitted 106 to a display device 108 for a display that is accessible to a user of the vehicle 14, such as a smartphone, or to a fleet manager. Alternatively, the forecast tire replacement date 98 may be wirelessly transmitted 110 from the processor 36 directly to the display device 108.

According to the above described structure and methodology, the tire replacement forecasting system 10 of the present invention includes a wear state predictor 112 that generates accurate and reliable estimates of the wear state 90 of each tire 12. The estimated wear states 90 are input into a forecasting model 92, which predicts future wear states 94 of each tire 12, and generates an optimum forecast tire replacement date 98.

The present invention also includes a method of forecasting replacement of a tire 12. The method includes steps in accordance with the description that is presented above and shown in FIGS. 1 through 10.

It is to be understood that the structure and method of the above-described tire replacement forecasting system may be altered or rearranged, or components or steps known to those skilled in the art omitted or added, without affecting the overall concept or operation of the invention. For example, electronic communication may be through a wired connection or wireless communication without affecting the overall concept or operation of the invention. Such wireless communications include radio frequency (RF) and Bluetooth® communications.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A tire replacement forecasting system comprising:
   a vehicle;
   a tire supporting the vehicle;
   a sensor unit being mounted on the tire, the sensor unit including:
      a footprint centerline length measurement sensor to measure a centerline length of a footprint of the tire; and
      a pressure sensor to measure a pressure of the tire;
   a processor in electronic communication with the sensor unit, the processor receiving the measured centerline length and the measured pressure;
   an electronic vehicle network transmitting selected vehicle parameters to the processor;
   a wear state predictor being stored on the processor and receiving the measured centerline length, the measured pressure, and the selected vehicle parameters as inputs, the wear state predictor generating an estimated wear state of the tire from the inputs, wherein the wear state predictor includes:
      a normalization module, the normalization module applying a pressure scaling factor to the centerline length measurement to generate a normalized footprint centerline length;
      a median estimator, the median estimator receiving multiple normalized footprint centerline lengths and calculating a median of the normalized footprint centerline lengths;
      a scaling module, the scaling module rescaling an initial value of the normalized footprint centerline lengths to a standard value and generating scaled footprint centerline lengths;
      an exponential moving average calculator, the exponential moving average calculator generating exponentially weighted footprint centerline lengths from the scaled footprint centerline lengths; and
      a wear state model receiving the exponentially weighted footprint centerline lengths and generating the estimated wear state of the tire;
   a forecasting model being stored on the processor and receiving as inputs multiple estimated wear states of the tire from the wear state predictor, the forecasting model predicting future wear states of the tire; and
   a forecast tire replacement date being generated by the forecasting model when the predicted future wear states of the tire are estimated to pass a predetermined wear threshold.

2. The tire replacement forecasting system of claim 1, wherein the selected vehicle parameters include vehicle speed, lateral acceleration, and longitudinal acceleration.

3. The tire replacement forecasting system of claim 2, wherein the wear state predictor includes a screening module, the screening module comparing the vehicle speed, the lateral acceleration, and the longitudinal acceleration to determine if the vehicle is coasting.

4. The tire replacement forecasting system of claim 1, wherein the wear state predictor includes a counter module, the counter module counting multiple centerline length measurements until a predetermined sample size of centerline length measurements is obtained.

5. The tire replacement forecasting system of claim 1, wherein the wear state model includes at least one of a classification model and a regression model.

6. The tire replacement forecasting system of claim 1, wherein the forecasting model includes a time series forecasting model.

7. The tire replacement forecasting system of claim 6, wherein the time series forecasting model includes an exponential smoothing model.

8. The tire replacement forecasting system of claim 1, further comprising a display device in electronic communication with the processor for receiving the forecast tire replacement date.

9. The tire replacement forecasting system of claim 1, wherein the sensor unit includes electronic memory capacity for storing identification information for the tire.

10. The tire replacement forecasting system of claim 1, wherein the sensor unit includes an antenna for wirelessly transmitting the measured parameters of tire pressure and centerline length to the processor.

11. The tire replacement forecasting system of claim 1, wherein the processor is integrated into the sensor unit.

12. The tire replacement forecasting system of claim 1, wherein the processor is a remote processor, the remote processor being at least one of a vehicle-based processor and a cloud-based processor.

13. A method of forecasting replacement of a tire supporting a vehicle, the method comprising the steps of:
 mounting a sensor unit on the tire;
 measuring a footprint centerline length of the tire with the sensor unit;
 measuring a pressure of the tire with the sensor unit;
 receiving the measured centerline length and the measured pressure in a processor;
 transmitting selected vehicle parameters from an electronic vehicle network to the processor;
 storing a wear state predictor on the processor;
 receiving the measured centerline length, the measured pressure, and the selected vehicle parameters as inputs into the wear state predictor;
 generating an estimated wear state of the tire with the wear state predictor from the inputs, wherein the wear state predictor includes:
  a normalization module, the normalization module applying a pressure scaling factor to the centerline length measurement to generate a normalized footprint centerline length;
  a median estimator, the median estimator receiving multiple normalized footprint centerline lengths and calculating a median of the normalized footprint centerline lengths;
  a scaling module, the scaling module rescaling an initial value of the normalized footprint centerline lengths to a standard value and generating scaled footprint centerline lengths;
  an exponential moving average calculator, the exponential moving average calculator generating exponentially weighted footprint centerline lengths from the scaled footprint centerline lengths; and
  a wear state model receiving the exponentially weighted footprint centerline lengths and generating the estimated wear state of the tire;
 storing a forecasting model on the processor;
 receiving as inputs into the forecasting model multiple estimated wear states of the tire from the wear state predictor;
 predicting future wear states of the tire with the forecasting model; and
 generating a forecast tire replacement date with the forecasting model when the predicted future wear states of the tire are estimated to pass a predetermined wear threshold.

14. The method of forecasting replacement of a tire supporting a vehicle of claim 13, wherein the selected vehicle parameters include vehicle speed, lateral acceleration, and longitudinal acceleration, and the method further comprises the step of comparing the vehicle speed, the lateral acceleration, and the longitudinal acceleration with a screening module to determine if the vehicle is coasting.

15. The method of forecasting replacement of a tire supporting a vehicle of claim 13, wherein the wear state predictor includes a wear state model, the wear state model including at least one of a classification model and a regression model.

\* \* \* \* \*